United States Patent
Lystad et al.

(10) Patent No.: US 9,934,478 B1
(45) Date of Patent: Apr. 3, 2018

(54) GENERATING AN ORDERING OF WORKFLOW ITEMS GIVEN A PARTIAL ORDERING AND EXTENSION DATA

(75) Inventors: Garr S. Lystad, Corinth, TX (US); Lori W. Debetaz, Plano, TX (US)

(73) Assignee: JDA Software Group, Inc., Scottsdale, AZ (US)

( * ) Notice: Subject to any disclaimer, the term of this patent is extended or adjusted under 35 U.S.C. 154(b) by 1988 days.

(21) Appl. No.: 09/956,439

(22) Filed: Sep. 18, 2001

Related U.S. Application Data (60) Provisional application No. 60/234,862, filed on Sep. 22, 2000.

(51) Int. Cl.
*G06Q 10/00* (2012.01)
*G06Q 10/06* (2012.01)

(52) U.S. Cl.
CPC .................. *G06Q 10/0633* (2013.01)

(58) Field of Classification Search
CPC ................................. G06Q 10/0633
USPC .................................... 705/8, 7.27
See application file for complete search history.

(56) References Cited

U.S. PATENT DOCUMENTS

| | | | | |
|---|---|---|---|---|
| 4,896,269 A | * | 1/1990 | Tong | 705/8 |
| 5,311,424 A | * | 5/1994 | Mukherjee | G06Q 10/06 700/105 |
| 5,630,070 A | * | 5/1997 | Dietrich | G06Q 10/06 705/7.12 |
| 5,794,246 A | * | 8/1998 | Sankaran et al. | 707/101 |
| 5,943,484 A | * | 8/1999 | Milne | G06Q 10/06 345/467 |

(Continued)

FOREIGN PATENT DOCUMENTS

| | | | | |
|---|---|---|---|---|
| JP | 60114905 A | * | 6/1985 | G05B 13/02 |
| JP | 62271660 A | * | 11/1987 | G06F 15/20 |
| JP | 63174836 A | * | 7/1988 | G06F 15/24 |

OTHER PUBLICATIONS

Agrawal, Just-in-time production of large assemblies, IIE Transactions, Aug. 1996, v.28, n.8, pp. 653-667 (15 pages).*

(Continued)

*Primary Examiner* — Alan S Miller
*Assistant Examiner* — Folashade Anderson
(74) *Attorney, Agent, or Firm* — Spencer Fane LLP; Steven J. Laureanti (57) ABSTRACT

A computer-implemented method of processing items associated with a workflow includes accessing information that specifies, for each item to be processed, each of one or more primary input items that may be required under normal conditions to produce the item to be processed. The method also includes accessing information that specifies, for at least one primary input item, an alternative input item that may replace the primary input item under alternative conditions in producing the item to be processed. The items to be processed are ordered such that: (a) each item to be processed that has one or more primary input items is placed ahead of its primary input items; and (b) each primary input item that has one or more alternative input items is placed ahead of its alternative input items provided doing so is not inconsistent with the ordering of items ordered according to condition (a) and is also not inconsistent with the ordering of items ordered according to condition (b). The ordered items are processed according to the ordering using a software component.

18 Claims, 3 Drawing Sheets

(56) References Cited

U.S. PATENT DOCUMENTS

| | | | | |
|---|---|---|---|---|
| 5,970,465 | A | * | 10/1999 | Dietrich et al. .................. 705/7 |
| 5,971,585 | A | * | 10/1999 | Dangat et al. ................. 700/102 |
| 6,049,742 | A | * | 4/2000 | Milne et al. .................... 700/99 |
| 6,049,774 | A | * | 4/2000 | Roy ................................. 705/8 |
| 6,088,626 | A | * | 7/2000 | Lilly et al. ........................ 705/8 |
| 6,119,102 | A | * | 9/2000 | Rush et al. .................... 705/29 |
| 6,151,582 | A | * | 11/2000 | Huang et al. ................. 705/7.25 |
| 6,182,071 | B1 | * | 1/2001 | Fushimi ............................ 707/7 |
| 6,279,009 | B1 | * | 8/2001 | Smirnov et al. .......... 707/103 R |
| 6,701,201 | B2 | * | 3/2004 | Hegde et al. ................. 700/107 |
| 6,889,197 | B2 | * | 5/2005 | Lidow ............................ 705/10 |
| 6,954,895 | B1 | * | 10/2005 | Oak .............................. 715/201 |
| 6,983,190 | B2 | * | 1/2006 | Denton et al. ................ 700/103 |
| 7,058,587 | B1 | * | 6/2006 | Horne .................... G06Q 10/06 705/7.22 |
| 7,149,984 | B1 | * | 12/2006 | Rock et al. ................... 715/838 |
| 7,188,333 | B1 | * | 3/2007 | LaMotta et al. ............. 717/106 |
| 7,233,914 | B1 | * | 6/2007 | Wijaya ................. G06Q 10/087 705/26.1 |
| 7,343,212 | B1 | * | 3/2008 | Brearley et al. ............. 700/106 |
| 7,970,638 | B2 | * | 6/2011 | Knipfer et al. ............. 705/7.11 |
| 2002/0055886 | A1 | * | 5/2002 | Hinckley ........................ 705/26 |
| 2003/0065574 | A1 | * | 4/2003 | Lawrence ....................... 705/26 |
| 2005/0090921 | A1 | * | 4/2005 | Denton .................. G06Q 10/04 700/100 |
| 2006/0079979 | A1 | * | 4/2006 | Giebels ............ G05B 19/41865 700/96 |
| 2006/0120401 | A1 | * | 6/2006 | Harada et al. ................. 370/465 |
| 2011/0093291 | A1 | * | 4/2011 | Leistner ............... G06Q 10/087 705/2 |
| 2011/0232008 | A1 | * | 9/2011 | Crisp ............................ 12/18.1 |
| 2012/0117108 | A1 | * | 5/2012 | Mooney ............... G06Q 10/087 707/769 |
| 2015/0120373 | A1 | * | 4/2015 | Bajaj .................. G06Q 10/0635 705/7.25 |

OTHER PUBLICATIONS

Offodile, Part family formation for variety reduction in flexible manufacturing systems, International Journal of Operations & Production Management, v.17, n.3, pp. 291-304 (14 pages).*

Juran (editor), Juran's Quality Handbook, 5$^{th}$ Ed., 1999, pp. 22.35-22.37 (5 pages).*

Koshal (editor), Manufacturing Engineer's Reference Book, 1993, p. 14/58-14/73 and 15/1-15/32 (49 pages).*

Greene, James H.; Production and Inventory Control Handbook, McGraw-Hill, 1997.*

Greene, James H. Production and Inventory Control Handbook, McGraw-Hill, 1997, Introduction, Chapter 4, Chapter 11, Chapter 12, Chapter 24, Chapter 28, and Chapter 29.*

Hax, Arnoldo C.; Meal, Harlan C.; Hierarchical Integration of Production Planning and Scheduling, 1973.*

JDEdwards (WorldSoftware Configuration Management Guide Aug. 1997) Teaches BOM substitutions to all the use of bill of material substitutes in case of a shortage. NPL may be obtained from http://docs.oracle.com/cd/E40229_01/manufacturing/a81eacr.pdf.*

Netessine et al (Centralized and Competitive Inventory Models with Demand Substitution, 2003) Operation Research, vol. 51, No. 2, pp. 329-335.*

Oracle (Fulfilling Orders with Substitute Items, 2013) available at http://docs.oracle.com/cd/E39583_01/fscm92pbr0/eng/fscm/fsit/task_FulfillingOrderswithSubstituteItems-9f197e.html.*

* cited by examiner

GENERATING AN ORDERING OF WORKFLOW ITEMS GIVEN A PARTIAL ORDERING AND EXTENSION DATA

RELATED APPLICATIONS

This application claims priority under 35 U.S.C. § 119(e) to U.S. Provisional Application No. 60/234,862, filed Sep. 22, 2000.

TECHNICAL FIELD OF THE INVENTION

This invention relates to logistics planning, and more specifically generating a total ordering of workflow items given a partial ordering and extension data.

BACKGROUND OF THE INVENTION

Allocation of resources, which may include tangible resources (such as raw materials, component parts, equipment, and labor) or intangible resources (such as processing time and cost allocation), typically poses many challenges in commercial or other enterprises. Given the numerous ways in which available resources may be allocated in connection with activities of an enterprise, and the fact that resource allocation schemes may differ widely as to their efficacy (in terms of their ability to maximize output, profit, or other desired performance measures), complex systems for logistics planning have been developed. Such logistics planning systems have been advantageously used in, for example, manufacturing a product within a factory or other manufacturing environment. In considering a manufacturing process for an item, for example, it may be necessary to account for the materials, components, or other inputs that will be used in assembling, fabricating, processing, synthesizing, or otherwise producing the item. However, prior techniques have been suboptimal in that they have not typically employed intelligent methods to properly order items for consideration by an associated logistics planning system.

SUMMARY OF THE INVENTION

According to the present invention, disadvantages and problems associated with previous logistics planning techniques are reduced or eliminated.

In one embodiment of the present invention, a computer-implemented method of processing items associated with a workflow includes accessing information that specifies, for each item to be processed, one or more primary input items that may be required under normal conditions to produce the item to be processed. The method also includes accessing information that specifies, for at least one primary input item, an alternative input item that may replace the primary input item under alternative conditions in producing the item to be processed. The items to be processed are ordered such that: (a) each item to be processed that has one or more primary input items is placed ahead of its primary input items; and (b) each primary input item that has one or more alternative input items is placed ahead of its alternative input items provided doing so is not inconsistent with the ordering of items ordered according to condition (a) and is also not inconsistent with the ordering of items ordered according to condition (b). The ordered items are processed according to the ordering using a software component.

In another embodiment, a computer-implemented method of processing items associated with a workflow includes accessing information that specifies, for each of a plurality of items, one or more primary input items that under normal conditions would be upstream of the item within the workflow. The method also includes accessing information that specifies, for each of one or more items within the plurality of items, one or more alternative input items that under alternative conditions would be upstream of the item within the workflow instead of corresponding primary input items, where each alternative input item corresponds to one or more primary input items. An ordered list of the items is generated such that: (a) each item having one or more upstream primary input items is placed ahead of these primary input items; and (b) each primary input item corresponding to one or more alternative input items is placed ahead of these corresponding alternative input items provided doing so is not inconsistent with the ordering of items ordered according to condition (a) and is also not inconsistent with the ordering of items ordered according to condition (b). The items are processed according to the ordered list using a software component.

Particular embodiments of the present invention may provide one or more technical advantages. The present invention generates an ordering of items, which may be a total ordering, given a partial ordering of the items and extension data reflecting one or more extensions to the partial ordering. For example, the present invention may be used to sort items in a factory or other manufacturing environment such that (1) input items used to produce another item are placed behind that item in an ordered list of items and, at the same time, (2) any alternates to a primary item are placed behind the primary item in the ordered list where possible. Since the second criterion may contradict the first criterion in some cases, and may contradict itself in some cases, providing an efficient technique that uses the second criterion for the sort only when it is appropriate to do so may provide an important technical advantage in certain embodiments. In a particular embodiment in which items are associated with a manufacturing process, the generated ordering of items may be used in determining a total demand for an item considering demands for all other items to which the item is a direct or indirect input, which may allow for more efficient resource allocation, planning, scheduling, or other appropriate tasks. The present invention may allow a planning, scheduling, or other logistics system to loop through a list of all relevant items such that an item is considered before any of its input items and, to the extent possible consistent with this goal, such that a primary item is considered before one or more alternates of the primary item. One or more other technical advantages may be apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DESCRIPTION OF EXAMPLE EMBODIMENTS

In manufacturing environments, it may be desirable to reduce the complexity and number of calculations involved in determining demand or other values for items associated with a manufacturing process. Such items might include raw materials, component parts, assemblies, finished products, or any other suitable items. While items are primarily described as being physical things, or representations of physical things in a computer data structure, the present invention contemplates items being any appropriate tangible or intangible things, such as mere items of information. In some manufacturing environments, such as those involving lot sizing, consolidation, usage of primary versus alternate items, or other constraints, calculations are often simplified if the total demand or other value of interest for a particular item is known before attempting to determine how and in what quantities the particular item will be produced. To this end, it may be desirable to know the complete set of demands or other values of interest for all other items directly or indirectly produced using the particular item before planning the manufacture of the particular item. Intelligently ordering items for consideration by a suitable planning, scheduling, or other logistics system may help accomplish this goal. Those skilled in the art will appreciate that, although ordering of items in a manufacturing environment is primarily described, particularly for purposes of demand planning, the present invention encompasses the ordering or any suitable workflow items for any appropriate purpose. The present invention may be implemented in a system incorporating one or more processors, memory, and other resources associated with one or more computers.

As discussed above, computing efficiency may be enhanced where the total demand for an item is known before computation is attempted. To illustrate this, consider an example situation in which a factory must fill three separate customer orders, each customer order requiring ten units of some item A. In this example, the factory consolidates its manufacturing orders and will create as few manufacturing orders as possible to produce the thirty total units of item A that are needed to satisfy the three customer orders. This would mean producing all thirty units of item A in one manufacturing order. However, further assume in this example that lot sizing restrictions are imposed by the equipment used to build item A and require that each manufacturing order be for no less than fifteen units and no more than twenty-five units. Therefore, the thirty units of item A will need to be produced in at least two (and possibly more) manufacturing orders.

Processing the customer orders one at a time using a factory planning system might involve first creating a manufacturing order for ten units of item A to fill the first customer order. To fill the second customer order, the existing manufacturing order might be enlarged to account for the twenty total units of item A needed for the first and second customer orders. To fill the third customer order, however, several possibilities might exist depending on the sophistication of the planning system. The existing manufacturing order might be enlarged to twenty-five units, the maximum under the example lot-sizing restriction, and a new manufacturing order created for the minimum fifteen units, producing ten units more than necessary. The existing manufacturing order might be left at twenty units, and a new manufacturing order created for the minimum fifteen units, producing five more units than necessary. Or, to achieve the least wasteful overall plan, the existing manufacturing order might be reduced to fifteen units and a new manufacturing order created for the remaining fifteen units.

With any of these options, valuable time and computing resources may be wasted if each step involves recomputing the total demand for item A and reserving the items used in producing item A, the items used in producing these items, and so on upstream. On the other hand, if it is known at the outset that the total demand for item A is thirty units, two manufacturing orders may be created at the outset. As this simple example illustrates, valuable time and computing resources may be saved by knowing which downstream demands require item A as input and modeling those demands to arrive at the total demand for item A before modeling the manufacturing orders that will produce item A. Downstream demands for an item A may include customer orders, manufacturing operations associated with the production of another item, or any other suitable demands.

Given a set of items, a partial ordering of the items provides original ordering information specifying that for any two distinct items A and B in the partial ordering: (1) A occurs before B, (2) B occurs before A, or (3) A is unrelated to B. An extension of a partial ordering specifies additional ordering information that supplements the original ordering information in the partial ordering, indicating that some first item is earlier than (referred to where appropriate as being "less than" or "downstream of") some second item within a final sorted list of items where the original ordering information in the partial ordering might not have indicated this, thereby leaving the first item and the second item non-comparable with respect to ordering. As an example, a finished assembly A may require component parts B and C, but if a shortage of part C occurs, then part D may be used in place of part C. In this example, a partial ordering would specify parts B, C, and D all being later than (referred to where appropriate as being "greater than" or "upstream of") part A in a final sorted list of items. An extension to the partial ordering may specify part D being later in the final sorted list than part C, such that an associated logistics planning system may check for shortages of part C before processing part D. The extension formalizes the logic that even though part C and part D may be non-comparable with respect to ordering under the partial ordering, a certain ordering between them is desirable when the partial ordering is supplemented through the extension. The additional ordering information in the extension may in particular cases be contradictory to the original ordering information in the partial ordering or even self-contradictory (e.g., part D may be an alternate for part C under a certain set of conditions, while part C may be an alternate for part D under another set of conditions). The present invention contemplates an extension providing any appropriate additional ordering information to supplement the original ordering information in a partial ordering.

Given a set of items, a total ordering of the items specifies that for any two distinct items A and B in the total ordering: (1) A occurs before B or (2) B occurs before A (but not both), and therefore provides a final sorted list of items such as that described above with reference to partial orderings. In one embodiment, a total ordering specifies the order in which the items are processed (e.g., at an appropriate logistics planning system) such that the demand or other value of interest for each particular item is known at the time the particular item is processed. A total ordering of items may be generated according to the present invention given a partial ordering of the items and extension data that reflects one or more extensions to the partial ordering. An applicable logistics planning system will preferably account for both the partial ordering and the one or more extensions, as reflected in a total ordering, in performing its tasks.

In one embodiment, the present invention provides a technique for ordering items used within a workflow by obtaining information regarding the relative order of items and arranging these items such that they conform to the obtained information. As an example, the present invention may arrange items to facilitate more efficient calculation of the demand for each item, which is dependent on the demand for all items to which the considered item is an input. In logistics planning to facilitate the use of items within a factory or other workflow environment, it may be desirable to sort the items such that each output item of a workflow operation is placed before the one or more input items of the workflow operation. Pursuant to this ordering, one or more items at the front of a sorted list, for which demands are known, are analyzed first. Analysis then proceeds to subsequent items on the list, which are inputs to the previously listed items and for which demands will depend on the demands for the previously items to which the subsequently listed items are inputs. This ordering is preferably consistent with any extensions. In one embodiment, an ordering of items generated according to the present invention allows for more efficient calculation of demands or other values of interest for workflow items than has been possible using previous techniques.

Typically, production requirements are specified in routings concerning the inputs and outputs for a particular item. For example, a routing might be expressed as, "To produce one unit of assembly A using routing R1, two units of part B and three units of part C are needed." In this example, assembly A is considered to be "downstream" of parts B and C, because a manufacturing process is often thought of as a flow of items from the most "upstream" raw materials or component parts to the most downstream assemblies or finished products. To more efficiently calculate the demand or other value of interest for all the items in the process, the above items should be ordered such that assembly A is considered before parts B and C. Thus, in one embodiment, according to a "First Rule," an item downstream from another item in the workflow is placed earlier in the ordering than the other item.

The present invention preferably takes into account that there may be more than one way to produce assembly A, for example, if shortages of either part B or of part C occur. Assume routing R1 (described above) is the preferred mode for making assembly A. There may exist a routing R2 included in an extension that states, "To produce one unit of assembly A, a unit of part D may be used in place of a unit of part B if there is a shortage of part B." There may also exist a routing R3 included in another extension that states, "To produce one unit of assembly A, a unit of part E may be used in place of a unit of part C if there is a shortage of part C." To more efficiently calculate the demands or other values of interest for all the items in the process, according to the First Rule described above, assembly A is placed before parts B and C and also before parts D and E in the total ordering. Parts B and C are placed before parts D and E in the total ordering since demand or other calculations for parts B and C should proceed those for parts D and E; only if the quantities of parts B and/or C are insufficient to meet the demand for assembly A will additional demands for parts D and E (demands resulting from shortages of parts B and/or C) be calculated. Thus, in one embodiment, according to a "Second Rule," alternate parts (e.g., parts D and E) are placed in the total ordering behind the primary parts (e.g., parts B and C) they would replace.

In one embodiment, the present invention associates with each item two lists. The first of these lists is referred to as "d" for convenience and is denoted "d(G)" for an item G. This first list will eventually be filled with all items that are downstream of (i.e. directly or indirectly produced using) item G according to the partial ordering. Taking a simple example, if an item X is to be produced using a primary item P, and the primary item P has an alternative item A, then the first list for item P will include item X and the first list for item A will similarly include item X. The second list is referred to as "p" for convenience and is denoted "p(G)" for item G. This second list will eventually contain all items not in d(G) that one or more extensions would place downstream of item G. For the same example, where item X is to be produced using primary item P, and primary item P has an alternative item A, then the second list for item P will be empty (assuming in this example that item P is not an alternative item for some other primary item Q under a different routing). The second list for item A will include item P, all the items in the first list of item P, and all the items in the second list of item P, excluding any items already in the first list of item A. In creating a total ordering of workflow items G, the number of items in the p and d lists of each item G are determined and summed. The items G are then sorted such that the item G with the lowest sum, for example, a finished assembly that is not upstream of any other items G, is placed at the front of the total ordering. Remaining items G are ordered such that each item G is placed in front of any items having higher sums. This implements the First and Second Rules described above, with downstream items G being placed towards the front and alternative items G being placed behind their primary items. In one embodiment, the order among any items G with equivalent sums does not matter.

Thus, given a set of items, a partial ordering of the items, and extension data that specifies one or more extensions to the partial ordering, the present invention generates an ordering of the items that extends the partial ordering while satisfying both the partial ordering and the extensions, provided the extensions do not contradict the partial ordering and are also not self-contradictory. Stated another way, the total ordering preserves the partial ordering and incorporates that portion of the extension data that is consistent with the partial ordering and self-consistent. The generated ordering may be a total ordering as defined above. In alternative embodiments, the present invention may generate an ordering that extends the partial ordering but is not considered a total ordering. For example, within a distributed or other multi-processor computing environment, it might be desirable to search for items that remain non-comparable under a partial ordering and after factoring in appropriate extension data, and then to process these non-comparable items substantially simultaneously using multiple processors (each of the non-comparable items being processed by a different processor).

In the description that follows, the current item will be referred to as "U" because it will generally be upstream of the other items being discussed. U may be used as a loop variable or recursive variable, as will be made clear in each step of the process described below. It is also assumed that one reasonably skilled in the art could use flags for such standard purposes as preventing an item from having the same step performed on it multiple times, preventing lists from being searched unnecessarily, and preventing other unnecessary operations. Such techniques are well known and would only serve to obscure the essence of the present invention if included in the description that follows. Therefore, they are omitted.

Figure 1:
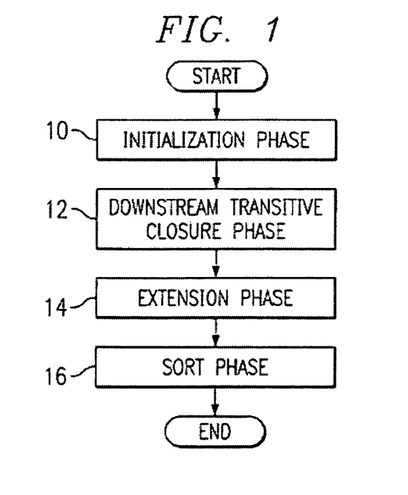
FIG. 1 illustrates an example process for generating an ordering of items given a partial ordering and extension data.

FIG. 1 illustrates an example process for generating a total ordering of workflow items given a partial ordering and one or more extensions. The process includes an initialization phase at step 10, where for each item U to be ordered the lists d(U) and p(U) are filled with the proper items. A downstream transitive closure (DTC) phase occurs at step 12, where for each item U to be ordered a DTC sub-process is performed with respect to the item U. An extension phase occurs at step 14, where each item D that should be placed earlier than ("downstream" of) item U according to the extension data is placed into p(U). A sort phase occurs at step 16, where the items U are sorted to generate an ordering, such as a total ordering, that extends the partial ordering. The initialization, DTC, extension, and sort phases are described in further detail below.

Figure 2:
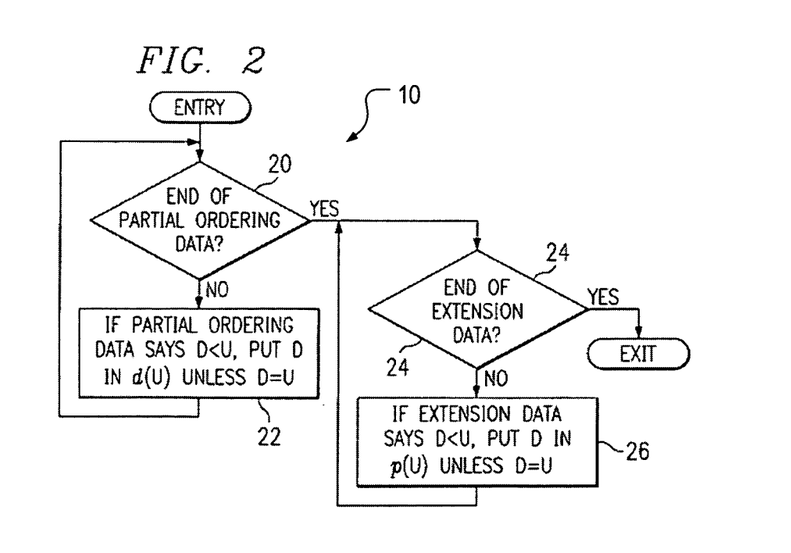
FIG. 2 illustrates an example initialization phase portion of an example process for generating an ordering of items given a partial ordering and extension data.

FIG. 2 illustrates an example initialization phase portion of an example process for generating an ordering of workflow items given a partial ordering and one or more extensions. The initialization phase of the process begins at steps 20 and 22, which collectively illustrate that for each item U to be ordered, a loop is performed through data containing the partial ordering until all items in the partial ordering have been considered. As an example, routings or any other suitable information may specify the partial ordering (i.e. for each item, specifying which items will be placed earlier than ("downstream" of or "less than") that item in a final sorted list). If an item D encountered should be placed immediately ahead of item U according to the partial ordering data, and item D is not the same as item U, then item D is added to d(U) at step 22. For example, steps 20 and 22 may take all items of which item U is a direct input and place these items into d(U). As a more particular example, assume that item U is a metal pin in a hinge assembly that is part of a door assembly. Steps 20 and 22 will place the hinge assembly into d(U), since the metal pin is a direct component of the hinge assembly in this example. However, steps 20 and 22 would not place the entire door assembly into d(U), because in this example the metal pin is not a direct component of the door assembly.

When all the items within the partial ordering data have been considered at step 20, the process proceeds to steps 24 and 26, which collectively illustrate that for each item U to be ordered, a loop is performed through the data containing one or more extensions to the partial ordering until all items in the extensions have been considered. If an item D encountered should be placed immediately ahead of item U according to the extension data, and item D is not the same as item U, then the item D is added to p(U) at step 26. As just an example, assume that an extension stated that bolt $U_b$ could replace the metal pin in the hinge assembly described above where a shortage of the metal pin exists. In this example, steps 24 and 26 would place the metal pin (though not the hinge assembly) into $p(U_b)$. The loops through the partial ordering data (steps 20 and 22) and the extension data (steps 24 and 26) may occur concurrently or in any suitable order. When all the items in the extension data have been considered at step 26, the initialization phase is complete. At the end of the initialization phase, for all items U, item U is neither a member of d(U) nor of p(U).

Figure 3:
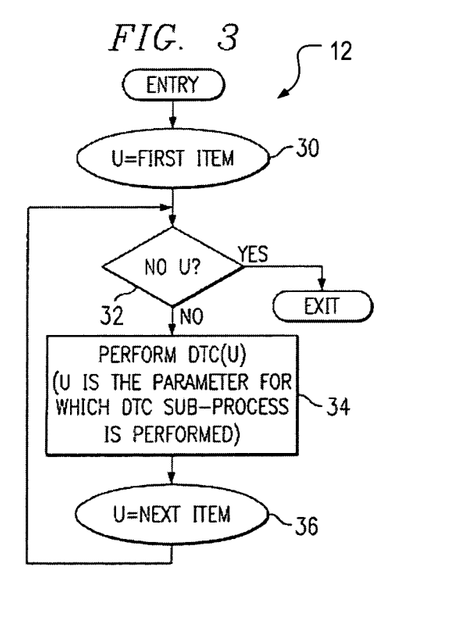
FIG. 3 illustrates an example downstream transitive closure phase portion of an example process for generating an ordering of items given a partial ordering and extension data.

FIG. 3 illustrates an example DTC phase portion of an example process for generating an ordering of workflow items given a partial ordering and one or more extensions. As collectively illustrated in steps 30 through 36, the DTC phase of the process involves looping through each item U to be ordered and performing a DTC sub-process for each item U at step 34, until the DTC sub-process has been performed for all such items at step 32, then the DTC sub-process is exited.

Figures 4, 6:
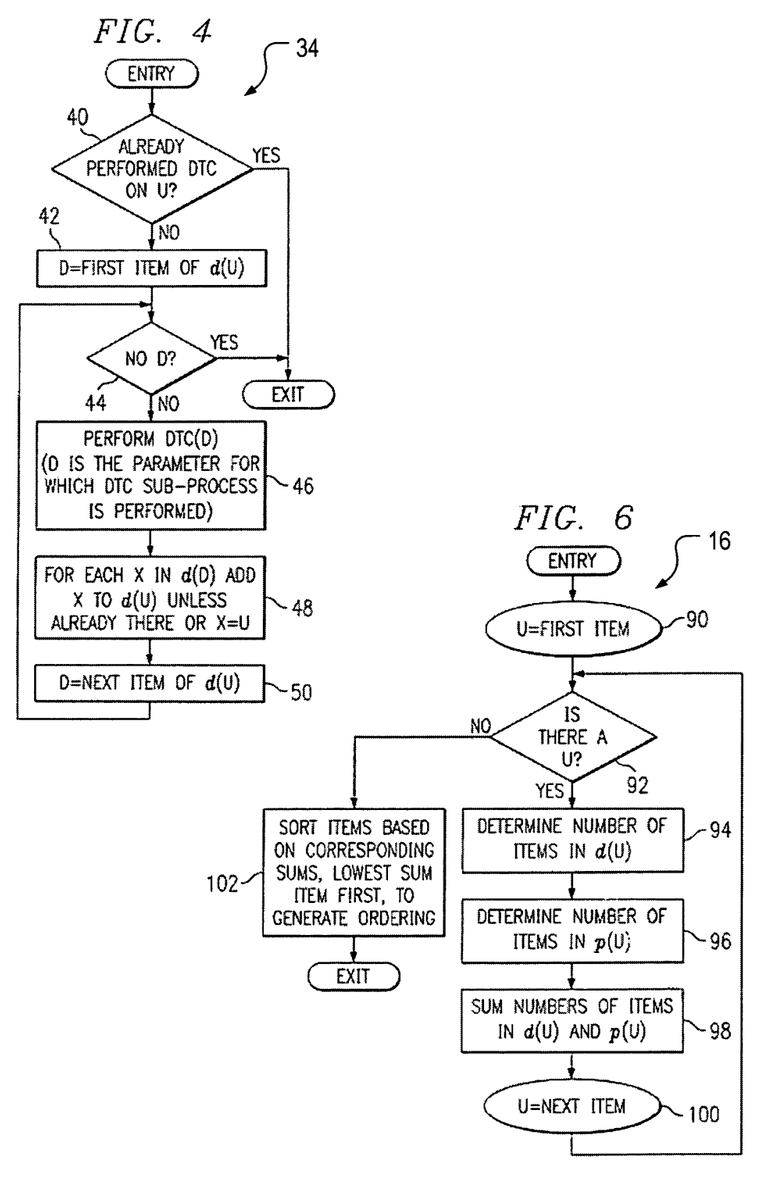
FIG. 4 illustrates an example downstream transitive closure sub-process.
FIG. 6 illustrates an example sort phase portion of an example process for generating an ordering of items given a partial ordering and extension data.

FIG. 4 illustrates an example DTC sub-process, which may be a function called within the DTC phase (at step 34 of FIG. 3 as described above). If the DTC sub-process has already been performed on item U at step 40, then the DTC sub-process is exited, we return to the caller of the DTC sub-process, and we proceed to either step 36 of FIG. 3 or step 48 of FIG. 4 as appropriate. If the DTC sub-process has not already been performed on item U at step 40, then as illustrated in steps 42 through 50, the DTC sub-process involves looping through each item D in d(U), performing the DTC sub-process on each item D (step 46), and copying or otherwise adding each item X in d(D) to d(U) unless item X is already in d(U) or item X is the same as item U (step 48). Set D=next item of d(U) at step 50; if no D then the process is exited at step 44.

To further illustrate the recursive nature of the DTC sub-process, assume for example that item A is made from item B, item B is made from item C, item C is made from item D, and item D is made from item U. After initialization (FIG. 2) in this example we expect that d(A) is empty, d(B) contains item A, d(C) contains item B, d(D) contains item C, and d(U) contains item D. For the sake of illustration, assume that the DTC sub-process is first called on item U, this call being referred to as "DTC(U)" for convenience. DTC(D) is called at step 46 within DTC(U), DTC(C) is in turn called at step 46 within DTC(D), DTC(B) is in turn called at step 46 within DTC(C), and DTC(A) is in turn called at step 46 within DTC(B). Since d(A) is empty, there is nothing to do in DTC(A) and DTC(A) is exited to step 48 of DTC(B). Since d(A) is empty, there is also nothing to do at step 48 within DTC(B) and DTC(B) is exited to step 48 within DTC(C). At step 48 within DTC(C), the contents (item A) of d(B) are copied or otherwise added to d(C) such that d(C) now contains both items A (the contents of d(B) just added) and B (there previously) downstream of item C. DTC(C) is exited to step 48 within DTC(D). At step 48 within DTC(D), the contents (items A and B) of d(C) are copied or otherwise added to d(D), such that d(D) now contains all items A, B, (the contents of d(C) just added) and C (there previously) downstream of D. DTC(D) is exited to step 48 within DTC(U). At step 48 within DTC(U), the contents (items A, B, and C) of d(D) are copied or otherwise added to d(U), such that d(U) now contains all items A, B, C, (the contents of d(D) just added) and D (there previously) downstream of U, which is the desired result.

The DTC sub-process considers each item D that is immediately downstream of item U. Step 46 ensures that d(D) contains not only the items that are immediately downstream of item D, but all items that are downstream of item D. Step 48 adds to d(U) all those items downstream of D (i.e. the contents of d(D)) to d(U). Since within the loop of FIG. 4 steps 46 and 48 are performed for each item D immediately downstream of item U, when the loop completes d(U) will contain all items that are downstream of item U.

Figure 5:
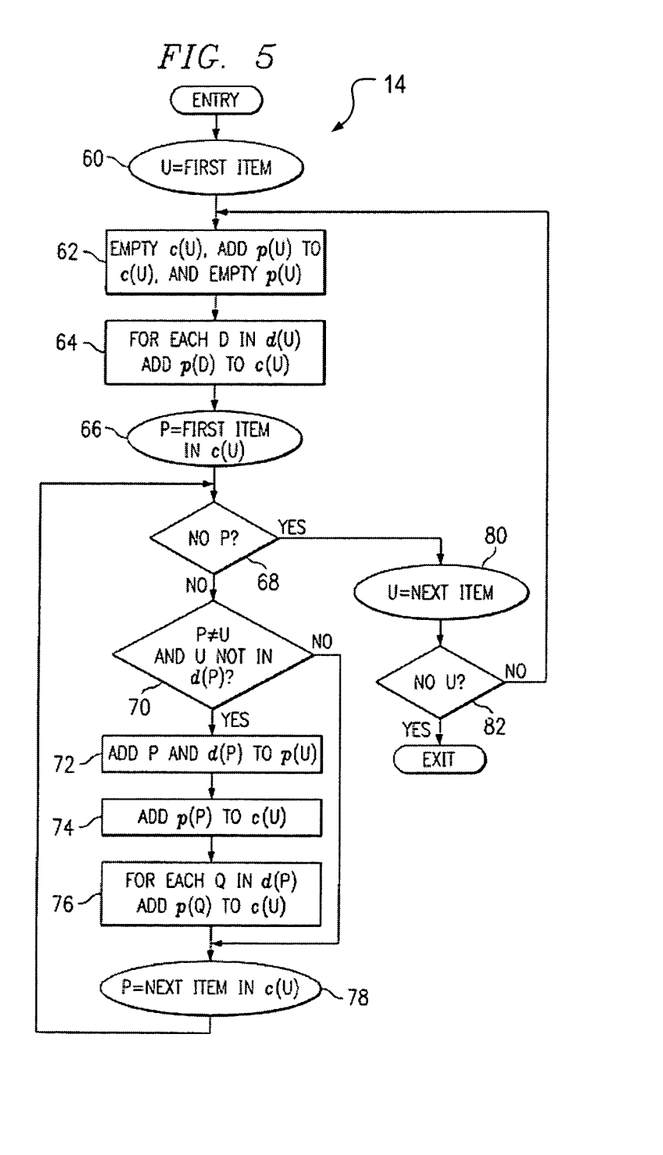
FIG. 5 illustrates an example extension phase portion of an example process for generating an ordering of items given a partial ordering and extension data.

FIG. 5 illustrates an example extension phase portion of an example process for generating an ordering of workflow items given a partial ordering and one or more extensions. As collectively illustrated in steps 60 through 82, the extension phase of the process involves looping through each item U to be ordered and placing each item that is ahead of ("downstream" of) item U according to the extension data into p(U). For an item U, at step 62, a list c(U) for the item U is emptied, the items contained in p(U) are placed in c(U), and p(U) is emptied. At step 64, for each item D in d(U), p(D) is added to c(U). Steps 66 through 78 involve looping through all the items P contained in c(U). For a current item P, if at step 70 item P is not the same as U and d(P) does not contain item U, then item P and the items in d(P) are copied or otherwise added to p(U) at step 72, the items in p(P) are copied or otherwise added to c(U) at step 74, and for each item Q in d(P) the items in p(Q) are copied or otherwise added to c(U) at step 76. In all copies or other adds performed within the extension phase, if the item to be added is already in d(U) or p(U), then the add should not be performed. Also, in connection with steps 74 and 76, if the item is item U itself or is already contained in c(U), then the add should not be performed. These exceptions may be used to prevent duplicates, items being common to both d(U) and p(U), and needless work. If at step 70 item P is the same as item U or d(P) contains item U, then the next item P within c(U) is considered. Set P=first item in c(U) at step 66. At step 68 evaluate item P. If item P is contained in c(U) then go to step 70. If item P is not contained in c(U) then go to step 80.

FIG. 6 illustrates an example sort phase portion of an example process for generating an ordering of workflow items given a partial ordering and one or more extensions. As collectively illustrated in steps 90 through 100, the sort phase of the process involves looping through each item U to be ordered and for a current item U, determining the number of items in d(U) at step 94, determining the number of items in p(U) at step 96, and summing the numbers of items in d(U) and p(U) at step 98. After all the items U have been considered at step 92, the items are sorted at step 102 based on their corresponding sums to generate the desired ordering. The generated ordering may be a total ordering as defined above. As described above, smaller sums will be associated with items that are ahead of other items (further "downstream"). Thus, the item with the lowest sum is not behind ("upstream" of) any other items and is placed at the front of the ordering. Items are ordered according to the First and Second Rules, such that more downstream items are placed towards the front and alternative items are placed behind their associated primary items where consistency allows. In one embodiment, ordering among items with equivalent sums does not matter. Thus, given some set of items, a partial ordering of the items, and one or more extensions to the partial ordering, an ordering is generated that extends the partial ordering, satisfying the partial ordering as well as the extensions, provided that the extensions do not contradict the partial ordering and are not self-contradictory.

Although example embodiments of the present invention have been described, a plurality of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer-implemented method of processing non-comparable items associated with a workflow, comprising:

accessing, by one or more computers, partial ordering data that describes, for each workflow item, one or more primary input items that is required under normal conditions to produce the workflow item;

accessing, by the one or more computers, extension data comprising one or more alternative input items to replace at least one of the one or more primary input items when there is insufficient quantity of the at least one of the one or more primary input items to meet a demand in producing the workflow item, the extension data specifies one or more extensions to the partial ordering data;

creating, by the one or more computers, for each of the workflow items, a first list comprising the one or more primary input items that are used to produce the workflow item according to the partial ordering data, wherein the one or more primary input items are not added to the list when the one or more primary input items are the same as the workflow item;

creating, by the one or more computers, for each of the workflow items, a second list comprising the one or more alternative input items that are used directly to produce the workflow item according to the extension data, wherein the one or more alternative input items are not added to the list when the one or more alternative input items are the same as the workflow item;

performing, by the one or more computers, a downstream transitive closure process, for each of the workflow items, by copying any items in the first list of the one or more primary input items of the workflow item to the first list of the workflow item and copying any items in the first list of the one or more primary input items of the one or more primary input items to the first list of the workflow item, wherein an item is not copied to the first list of the workflow item if the item is the same as the workflow item;

performing, by the one or more computers, an extension process, for each of the workflow items, by:
  copying all items in the second list of the workflow item to a third list of the workflow item;
  emptying all items from the second list of the workflow item;
  for each item in the first list of the workflow item, add all items from the second list of each item in the first list of the workflow item to the third list of the workflow item; and
  for each third list workflow item, adding the third list workflow item and any items in a first list of the third list workflow item to the second list of the workflow item, when the item is not the same as the workflow item and the workflow item is not in the first list of the third list workflow item, adding each item from a second list of the third list workflow item to the third list of the workflow item, and, for each item in the first list of the third list workflow item, adding any items in a second list of any items in the first list of the third list workflow item to the third list of the workflow item;

calculating, by the one or more computers, for each of the workflow items, a sum of a quantity of the items in the first list of the workflow item and a quantity of the items in the second list of the workflow item;

generating, by the one or more computers, an ordering of the calculated workflow items based on the sum of the quantity of the items in the first list of the workflow item and the quantity of the items in the second list of the workflow item such that:

(a) each workflow item that has one or more primary input items is placed ahead of its primary input items; and (b) each primary input item that has one or more alternative input items is placed ahead of its alternative input items provided doing so is not inconsistent with the ordering of items ordered according to condition (a); and when at least a first item and a second item are non-comparable with respect to the ordering of the calculated workflow items, processing the at least the first and second non-comparable items simultaneously using a different processor of the one or more computers.

2. The computer-implemented method of claim 1, wherein processing the at least two non-comparable items comprises determining a workflow value for the at least two non-comparable items.

3. The computer-implemented method of claim 1, wherein the least two non-comparable items comprise tangible items associated with a manufacturing process, processing the least two non-comparable items comprises determining a demand value for the least two non-comparable items.

4. The computer-implemented method of claim 1, wherein the extension data further specifies which input items are primary input items to the item they produce.

5. A manufacturing system of processing non-comparable items associated with a workflow comprising:

a manufacturer comprising one or more computers each comprising a memory and at least one processor, the one or more computers configured to:

access partial ordering data that describes, for each workflow item, one or more primary input items that is required under normal conditions to produce the workflow item;

access extension data comprising one or more alternative input items to replace at least one of the one or more primary input items when there is insufficient quantity of the at least of the one or more primary input items to meet a demand in producing the workflow item, the extension data specifies one or more extensions to the partial ordering data;

create, for each of the workflow items, a first list comprising the one or more primary input items that are used to produce the workflow item according to the partial ordering data, wherein the one or more primary input items are not added to the list when the one or more primary input items are the same as the workflow item;

create, for each of the workflow items, a second list comprising the one or more alternative input items that are used directly to produce the workflow item according to the extension data, wherein the one or more alternative input items are not added to the list when the one or more alternative input items are the same as the workflow item;

perform a downstream transitive closure process, for each of the workflow items, by copying any items in the first list of the one or more primary input items of the workflow item to the first list of the workflow item and copying any items in the first list of the one or more primary input items of the one or more primary input items to the first list of the workflow item, wherein an item is not copied to the first list of the workflow item if the item is the same as the workflow item;

perform an extension process, for each of the workflow items, by:

copying all items in the second list of the workflow item to a third list of the workflow item;

emptying all items from the second list of the workflow item;

for each item in the first list of the workflow item, adding all items from the second list of each item in the first list of the workflow item to the third list of the workflow item; and for each third list workflow item, adding the third list workflow item and any items in a first list of the third list workflow item to the second list of the workflow item, when the item is not the same as the workflow item and the workflow item is not in the first list of the third list workflow item, adding each item from a second list of the third list workflow item to the third list of the workflow item, and, for each item in the first list of the third list workflow item, adding any items in a second list of any items in the first list of the third list workflow item to the third list of the workflow item;

calculate, for each of the workflow items, a sum of a quantity of the items in the first list of the workflow item and a quantity of the items in the second list of the workflow item;

generate an ordering of the calculated workflow items to be processed based on the sum of the quantity of the items in the first list of the workflow item and the quantity of the items in the second list of the workflow item such that:

(a) each workflow item that has one or more primary input items is placed ahead of its primary input items; and (b) each primary input item that has one or more alternative input items is placed ahead of its alternative input items provided doing so is not inconsistent with the ordering of items ordered according to condition (a); and when at least a first item and a second item are non-comparable with respect to the ordering of the calculated workflow items, process the at least the first and second non-comparable items simultaneously using a different processor of the one or more computers.

6. The system of claim 5, wherein processing the at least two non-comparable items further comprises determine a workflow value for the at least two non-comparable items.

7. The system of claim 5, wherein the at least two non-comparable items comprise tangible items associated with a manufacturing process and process an ordered item comprises determine a demand value for the least two non-comparable items.

8. The system of claim 5, wherein the extension data further specifies which input items are primary input items to the item they produce.

9. A non-transitory computer-readable media embodied with software, the software when executed by one or more computers is configured to:

access partial ordering data that describes, for each workflow item, one or more primary input items that is required under normal conditions to produce the workflow item;

access extension data comprising one or more alternative input items to replace at least one of the one or more primary input items when there is insufficient quantity of the at least one of the one or more primary input items to meet a demand in producing the workflow item, the extension data specifies one or more extensions to the partial ordering data;

create, for each of the workflow items, a first list comprising the one or more primary input items that are used to produce the workflow item according to the partial ordering data, wherein the one or more primary input items are not added to the list when the one or more primary input items are the same as the workflow item;

create, for each of the workflow items, a second list comprising the one or more alternative input items that are used directly to produce the workflow item according to the extension data, wherein the one or more alternative input items are not added to the list when the one or more alternative input items are the same as the workflow item;

perform a downstream transitive closure process, for each of the workflow items, by copying any items in the first list of the one or more primary input items of the workflow item to the first list of the workflow item and copying any items in the first list of the one or more primary input items of the one or more primary input items to the first list of the workflow item, wherein an item is not copied to the first list of the workflow item if the item is the same as the workflow item;

perform an extension process, for each of the workflow items, by:
  copying all items in the second list of the workflow item to a third list of the workflow item;
  emptying all items from the second list of the workflow item;
  for each item in the first list of the workflow item, adding all items from the second list of each item in the first list of the workflow item to the third list of the workflow item; and
  for each third list workflow item, adding the third list workflow item and any items in a first list of the third list workflow item to the second list of the workflow item, when the item is not the same as the workflow item and the workflow item is not in the first list of the third list workflow item, adding each item from a second list of the third list workflow item to the third list of the workflow item, and, for each item in the first list of the third list workflow item, adding any items in a second list of any items in the first list of the third list workflow item to the third list of the workflow item;

calculate, for each of the workflow items, a sum of a quantity of the items in the first list of the workflow item and a quantity of the items in the second list of the workflow item;

generate an ordering of the calculated workflow items to be processed based on the sum of the quantity of the items in the first list of the workflow item and the quantity of the items in the second list of the workflow item such that:
  (a) each item to be processed that has one or more primary input items is placed ahead of its primary input items; and
  (b) each primary input item that has one or more alternative input items is placed ahead of its alternative input items provided doing so is not inconsistent with the ordering of items ordered according to condition (a); and when at least a first item and a second item are non-comparable with respect to the ordering of the calculated workflow items, process the at least the first and second non-comparable items simultaneously using a different processor of one or more computers.

10. The non-transitory computer-readable media of claim 9, wherein processing the at least two non-comparable items comprises determining a workflow value for the at least two non-comparable items.

11. The non-transitory computer-readable media of claim 9, wherein the at least two non-comparable items comprise tangible items associated with a manufacturing process and processing an ordered item comprises determining a demand value for the least two non-comparable items.

12. The non-transitory computer-readable media of claim 9, wherein the extension data further specifies which input items are primary input items to the item they produce.

13. A computer-implemented method, comprising:
  accessing, by one or more computers, partial ordering data that describes, for each of a plurality of items, one or more primary input items that under normal conditions is upstream of a workflow item;
  accessing, by the one or more computers, extension data that specifies, for each of one or more items within the plurality of items, one or more alternative input items that under alternative conditions would be upstream of the workflow item instead of corresponding primary input items, each alternative input item corresponding to one or more primary input items, the extension data specifies one or more extensions to the partial ordering data;
  creating, by the one or more computers, for each of the workflow items, a first list comprising the one or more primary input items that are used to produce the workflow item according to the partial ordering data, wherein the one or more primary input items are not added to the list when the one or more primary input items are the same as the workflow item;
  creating, by the one or more computers, for each of the workflow items, a second list comprising the one or more alternative input items that are used directly to produce the workflow item according to the extension data, wherein the one or more alternative input items are not added to the list when the one or more alternative input items are the same as the workflow item;
  performing, by the one or more computers, a downstream transitive closure process, for each of the workflow items, by copying any items in the first list of the one or more primary input items of the workflow item to the first list of the workflow item and copying any items in the first list of the one or more primary input items of the one or more primary input items to the first list of the workflow item, wherein an item is not copied to the first list of the workflow item if the item is the same as the workflow item;
  performing, by the one or more computers, an extension process, for each of the workflow items, by:
    copying all items in the second list of the workflow item to a third list of the workflow item;
    emptying all items from the second list of the workflow item;
    for each item in the first list of the workflow item, add all items from the second list of each item in the first list of the workflow item to the third list of the workflow item; and
    for each third list workflow item, adding the third list workflow item and any items in a first list of the third list workflow item to the second list of the workflow item, when the item is not the same as the workflow item and the workflow item is not in the first list of the third list workflow item, adding each item from a second list of the third list workflow item to the third list of the workflow item, and, for each item in the first list of the third list workflow item, adding any items in a second list of any items in the first list of the third list workflow item to the third list of the workflow item;

calculating, by the one or more computers, for each of the workflow items, a sum of a quantity of the items in the first list of the workflow item and a quantity of the items in the second list of the workflow item;

generating by the computer, an ordered list of the calculated workflow items based on the sum of the quantity of the items in the first list of the workflow item and the quantity of the items in the second list of the workflow item such that:
   (a) each item having one or more upstream primary input items is placed ahead of these primary input items; and
   (b) each primary input item corresponding to one or more alternative input items is placed ahead of these corresponding alternative input provided doing so is not inconsistent with the ordering of items ordered according to condition (a); and when at least a first item and a second item are non-comparable with respect to the ordering of the calculated workflow items, processing the at least the first and second non-comparable items simultaneously using a different processor of the one or more computers.

14. The computer-implemented method of claim 13, wherein the items comprise tangible items associated with a manufacturing process, processing the items comprises determining demand values for the items.

15. A system comprising one or more computers each comprising a memory and at least one processor, the one or more computers is configured to:
   access partial ordering data that describes, for each of a plurality of items, one or more primary input items that under normal conditions are upstream of a workflow item;
   access extension data that specifies, for each of one or more items within the plurality of items, one or more alternative input items that under alternative conditions are upstream of the workflow item instead of corresponding primary input items, each alternative input item corresponding to one or more primary input items, the extension data specifies one or more extensions to the partial ordering data;
   create, for each of the workflow items, a first list comprising the one or more primary input items that are used to produce the workflow item according to the partial ordering data, wherein the one or more primary input items are not added to the list when the one or more primary input items are the same as the workflow item;
   create, for each of the workflow items, a second list comprising the one or more alternative input items that are used directly to produce the workflow item according to the extension data, wherein the one or more alternative input items are not added to the list when the one or more alternative input items are the same as the workflow item;
   perform a downstream transitive closure process, for each of the workflow items, by copying any items in the first list of the one or more primary input items of the workflow item to the first list of the workflow item and copying any items in the first list of the one or more primary input items of the one or more primary input items to the first list of the workflow item, wherein an item is not copied to the first list of the workflow item if the item is the same as the workflow item;
   perform an extension process, for each of the workflow items, by:
      copying all items in the second list of the workflow item to a third list of the workflow item;
      emptying all items from the second list of the workflow item;
      for each item in the first list of the workflow item, adding all items from the second list of each item in the first list of the workflow item to the third list of the workflow item; and
      for each third list workflow item, adding the third list workflow item and any items in a first list of the third list workflow item to the second list of the workflow item, when the item is not the same as the workflow item and the workflow item is not in the first list of the third list workflow item, adding each item from a second list of the third list workflow item to the third list of the workflow item, and, for each item in the first list of the third list workflow item, adding any items in a second list of any items in the first list of the third list workflow item to the third list of the workflow item;
   calculate, for each of the workflow items, a sum of a quantity of the items in the first list of the workflow item and a quantity of the items in the second list of the workflow item;
   generate an ordered list of the calculated workflow items based on the sum of the quantity of the items in the first list of the workflow item and the quantity of the items in the second list of the workflow item such that:
      (a) each item having one or more upstream primary input items is placed ahead of these primary input items; and
      (b) each primary input item corresponding to one or more alternative input items is placed ahead of these corresponding alternative input items provided doing so is not inconsistent with the ordering of items ordered according to condition (a); and
   when at least a first item and a second item are non-comparable with respect to the ordering of the calculated workflow items, process the at least the first and second non-comparable items simultaneously using a different processor of the one or more computers.

16. The system of claim 15, wherein the items comprise tangible items associated with a manufacturing process and processing the items comprises determining demand values for the items.

17. A non-transitory computer-readable media embodied with software, the software when executed by one or more computers is configured to:
   access information that describes, for each of a plurality of items, one or more primary input items that under normal conditions would be upstream of a workflow item;
   access partial ordering data that specifies, for each of one or more items within the plurality of items, one or more alternative input items that under alternative conditions would be upstream of the workflow item instead of corresponding primary input items, each alternative input item corresponding to one or more primary input items, the extension data specifies one or more extensions to the partial ordering data;

create, for each of the workflow items, a first list comprising the one or more primary input items that are used to produce the workflow item according to the partial ordering data, wherein the one or more primary input items are not added to the list when the one or more primary input items are the same as the workflow item;

create, for each of the workflow items, a second list comprising the one or more alternative input items that are used directly to produce the workflow item according to the extension data, wherein the one or more alternative input items are not added to the list when the one or more alternative input items are the same as the workflow item;

perform a downstream transitive closure process, for each of the workflow items, by copying any items in the first list of the one or more primary input items of the workflow item to the first list of the workflow item and copying any items in the first list of the one or more primary input items of the one or more primary input items to the first list of the workflow item, wherein an item is not copied to the first list of the workflow item if the item is the same as the workflow item;

perform an extension process, for each of the workflow items, by:
  copying all items in the second list of the workflow item to a third list of the workflow item;
  emptying all items from the second list of the workflow item;
  for each item in the first list of the workflow item, adding all items from the second list of each item in the first list of the workflow item to the third list of the workflow item; and
  for each third list workflow item, adding the third list workflow item and any items in a first list of the third list workflow item to the second list of the workflow item, when the item is not the same as the workflow item and the workflow item is not in the first list of the third list workflow item, adding each item from a second list of the third list workflow item to the third list of the workflow item, and, for each item in the first list of the third list workflow item, adding any items in a second list of any items in the first list of the third list workflow item to the third list of the workflow item;

calculate, for each of the workflow items, a sum of a quantity of the items in the first list of the workflow item and a quantity of the items in the second list of the workflow item;

generate an ordered list of the calculated workflow items based on the sum of the quantity of the items in the first list of the workflow item and the quantity of the items in the second list of the workflow item such that:
  (a) each item having one or more upstream primary input items is placed ahead of these primary input items; and
  (b) each primary input item corresponding to one or more alternative input items is placed ahead of these corresponding alternative input items provided doing so is not inconsistent with the ordering of items ordered according to condition (a); and when at least a first item and a second item are non-comparable with respect to the ordering of the calculated workflow items, process the at least the first and second non-comparable items simultaneously using a different processor of one or more computers.

18. The non-transitory computer-readable media of claim 17, wherein the items comprise tangible items associated with a manufacturing process and processing the items comprises determining demand values for the items.

* * * * *